(12) United States Patent
Yu et al.

(10) Patent No.: US 12,337,636 B2
(45) Date of Patent: Jun. 24, 2025

(54) SUSPENSION STRUCTURE AND VEHICLE

(71) Applicant: CONTEMPORARY AMPEREX TECHNOLOGY (HONG KONG) LIMITED, Hong Kong (CN)

(72) Inventors: Xiaowei Yu, Ningde (CN); Xiaoxuan Fan, Ningde (CN); Kai Wu, Ningde (CN); Liwen Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/636,267

(22) Filed: Apr. 16, 2024

(65) Prior Publication Data
US 2024/0253411 A1    Aug. 1, 2024

Related U.S. Application Data

(63) Continuation of application No. PCT/CN2022/128439, filed on Oct. 28, 2022.

(30) Foreign Application Priority Data

Nov. 22, 2021    (CN) .......................... 202122875010.8

(51) Int. Cl.
| | |
|---|---|
| *B60G 11/08* | (2006.01) |
| *B60G 11/12* | (2006.01) |
| *B60G 13/00* | (2006.01) |

(52) U.S. Cl.
CPC .............. *B60G 11/08* (2013.01); *B60G 11/12* (2013.01); *B60G 13/005* (2013.01);
(Continued)

(58) Field of Classification Search
CPC .............. B60G 11/08; B60G 2202/114; B60G 2206/428; B60G 17/0275; B60G 17/023;
(Continued)

(56) References Cited

U.S. PATENT DOCUMENTS

| | | | | |
|---|---|---|---|---|
| 134,703 A | * | 1/1873 | Post ....................... | B60G 11/08 267/7 |
| 251,239 A | * | 12/1881 | Kartnaz, Jr. et al. .. | B60G 11/08 267/7 |

(Continued)

FOREIGN PATENT DOCUMENTS

| | | | |
|---|---|---|---|
| CN | 104723817 A | | 6/2015 |
| CN | 104742675 A | * | 7/2015 |

(Continued)

OTHER PUBLICATIONS

Wang, Transverse Leaf Spring With Balance Rod Rear Axle Assembly, Jul. 1, 2015, EPO, CN 104742675 A, Machine Translation of Description (Year: 2015).*

(Continued)

*Primary Examiner* — Paul N Dickson
*Assistant Examiner* — Matthew D Lee
(74) *Attorney, Agent, or Firm* — K&L Gates LLP

(57) ABSTRACT

A suspension structure and a vehicle are disclosed. The suspension structure includes: a leaf spring assembly, a connecting bracket, and a steering knuckle. The leaf spring assembly includes two leaf spring components arranged along a front-to-back direction. Each of the leaf spring components is arranged transversely relative to a main structure. A middle of each leaf spring component is fixedly connected to the main structure. Two free ends are disposed along a length direction of each leaf spring component. The free ends include a mounting portion. The connecting bracket includes a bracket body and a ball pin. The bracket body includes a first arm body and a second arm body. The first arm body intersects one end of the second arm body, and is connected to the ball pin at an intersecting end.

20 Claims, 4 Drawing Sheets

(52) U.S. Cl.
CPC .. *B60G 2202/114* (2013.01); *B60G 2204/121* (2013.01); *B60G 2204/129* (2013.01); *B60G 2206/428* (2013.01)

(58) Field of Classification Search
CPC ............ B60G 2204/121; B60G 13/005; B60G 2204/129
See application file for complete search history.

(56) References Cited

U.S. PATENT DOCUMENTS

| | | | | |
|---|---|---|---|---|
| 304,292 | A * | 9/1884 | Buckler et al. | B60G 11/08 267/38 |
| 915,337 | A * | 3/1909 | Emlet | B60G 11/08 180/905 |
| 1,351,111 | A | 8/1920 | Luke | |
| 1,576,920 | A * | 3/1926 | Lundelius | B60G 11/08 267/52 |
| 1,776,442 | A * | 9/1930 | Lessing | B60G 17/023 267/47 |
| 2,206,970 | A * | 7/1940 | Megow | B60G 11/08 180/41 |
| 2,553,746 | A * | 5/1951 | Camilly | B60G 11/08 280/124.171 |
| 4,813,704 | A * | 3/1989 | Smith | B60G 3/265 280/124.171 |
| 2020/0353785 | A1 * | 11/2020 | Cho | B60G 11/04 |

FOREIGN PATENT DOCUMENTS

| | | | |
|---|---|---|---|
| CN | 108638777 A | 10/2018 | |
| CN | 208914914 U | 5/2019 | |
| CN | 210502150 U | 5/2020 | |
| CN | 211844001 U | 11/2020 | |
| CN | 112606647 A | 4/2021 | |
| CN | 216374098 U | 4/2022 | |
| CN | 216401548 U | 4/2022 | |
| CN | 118386749 A * | 7/2024 | |
| WO | WO-2025003176 A1 * | 1/2025 | ............ B60G 11/02 |

OTHER PUBLICATIONS

International Search Report received in the corresponding international application PCT/CN2022/128439, mailed on Dec. 15, 2022.

* cited by examiner

SUSPENSION STRUCTURE AND VEHICLE

CROSS-REFERENCE TO RELATED APPLICATIONS

This application is a continuation of International Application No. PCT/CN2022/128439, filed Oct. 28, 2022, which claims priority to Chinese Patent Application No. 202122875010.8, filed on Nov. 22, 2021 and entitled "SUSPENSION STRUCTURE AND VEHICLE", which is incorporated herein by reference in its entirety.

TECHNICAL FIELD

This application relates to the technical field of vehicles, and in particular, to a suspension structure and a vehicle.

BACKGROUND

Currently, as a market trend, the application scenarios and market demands for vehicles are progressively diversified. To meet different application scenarios and market demands, vehicles have been improved greatly in terms of power source, suspension structure, body structure, and the like. The suspension structure is a generic term for all the power transmission linkage apparatuses between a frame and wheels of a vehicle, and is configured to transmit the force and torque between the frame and the wheels, cushion the impact load transmitted to the frame due to a uneven road surface, and attenuate vibration of the vehicle body caused by road surface impact, so as to ensure smooth movement of the vehicle.

A conventional suspension structure generally includes an elastic element, a steering mechanism, a damper, and the like, and in some cases, may further include a buffer block, a stabilizer bar, and the like. The elastic element is typically a spring, a leaf spring, or the like. In a case that the elastic element is a leaf spring, the elastic element is generally formed by a group of leaf spring components. The steering mechanism generally includes a steering knuckle, an upper swing arm, a lower swing arm, and the like. An existing suspension structure generally includes a stand-alone elastic element and a stand-alone lower swing arm, and is characterized by a high cost, a heavy weight, and a complex structure. Therefore, it is urgent to improve the lightness of weight and stability of the suspension structure.

Technical Problems

This application provides a suspension structure to improve the lightness of weight and stability of the suspension structure.

Technical Solutions

A first aspect of this application provides a suspension structure, including: a leaf spring assembly, a connecting bracket, and a steering knuckle. The leaf spring assembly includes two leaf spring components arranged along a front-to-back direction. Each of the leaf spring components is arranged transversely relative to a main structure. A middle of each leaf spring component is fixedly connected to the main structure. Two free ends are disposed along a length direction of each leaf spring component. The free ends include a mounting portion. The connecting bracket includes a bracket body and a ball pin. The bracket body includes a first arm body and a second arm body. The first arm body intersects one end of the second arm body, and is connected to the ball pin at an intersecting end. The first arm body and another end of the second arm body are fixedly connected to two adjacent mounting portions of the two leaf spring components respectively by a first fixing mechanism. A lower end of the steering knuckle is connected to the ball pin of the connecting bracket.

In some embodiments, the suspension structure further includes a damper and two damper mounting brackets. The two damper mounting brackets are disposed on the two adjacent mounting portions of the two leaf spring components respectively. The damper is connected to the two damper mounting brackets by a first connecting mechanism. The damper mounting brackets are disposed on the mounting portions of the leaf spring components, and provide mounting positions for the damper. In this way, the damper is connected between the two leaf spring components and arranged on a wheel hop centerline. The damper is stressed evenly and can avoid withstanding a bias torque, thereby providing a better damping effect to improve the stability of the suspension structure.

In some embodiments, the damper mounting brackets and the mounting portions of the leaf spring components are formed in one piece or fixedly connected, so that the damper mounting brackets are fixed to the mounting portions, thereby making it convenient to mount the damper between the two leaf spring components.

In some embodiments, the first fixing mechanism and the first connecting mechanism each include a bolt and a nut. The bolt combines with the nut to implement position limiting and fastening, and also implement a detachable assembling manner of the first fixing mechanism and the first connecting mechanism.

In some embodiments, the leaf spring component includes at least two leaf springs, a leaf spring connector, and two mounting portions. The at least two leaf springs overlap along a vertical direction. Lengths of the at least two leaf springs decrease gradually from bottom up. The at least two leaf springs include a first leaf spring and a second leaf spring. The length of the first leaf spring is greater than the length of the second leaf spring. The leaf spring connector is configured to fixedly connect lengthwise body portions of the at least two leaf springs together. The two mounting portions are disposed at the free end of the first leaf spring. The leaf spring component includes at least two leaf springs, thereby not only enhancing the connection strength and durability of the leaf spring component, but also improving the fatigue life of the leaf spring component. Moreover, the first leaf spring is equipped with two mounting portions, thereby providing mounting space for the damper and the connecting bracket, and in turn, improving the utilization rate of the mounting space of the vehicle.

In some embodiments, two ends of the second leaf spring are rolled lugs. The second leaf spring is disposed above the first leaf spring. Because the length of the first leaf spring is greater than the length of the second leaf spring, arranging the second leaf spring above the first leaf spring makes it convenient to form a rolled lug structure at both ends of the second leaf spring, and improves the elastic stiffness of the leaf spring assembly. In addition, when a wheel is impacted, the rolled lug structure of the second leaf spring can provide space for the first leaf spring to bounce up and down.

In some embodiments, the leaf spring assembly further includes a reinforcing plate and a leaf spring mounting bush. The reinforcing plate is disposed below the two leaf spring components and configured to support the two leaf spring components. The leaf spring mounting bush is disposed on the leaf spring component at a position opposite to an end of the reinforcing plate, and is configured to wrap the leaf spring component, thereby further fastening the first leaf spring and the second leaf spring, limiting positions of the first leaf spring and the second leaf spring lengthwise and vertically when the wheels are hopping, and also serving a padding function and a wear protection function.

In some embodiments, a plurality of leaf spring fixing holes are created in the middle of each leaf spring component. The middle of the reinforcing plate is connected to the two leaf spring components through the leaf spring fixing holes. The leaf spring fixing holes make it convenient to mount the reinforcing plate. The reinforcing plate not only enhances the firmness of connection between the two leaf spring components, but also improves the stability of the entire suspension structure, and in turn, increases the load-bearing capacity of the suspension structure.

In some embodiments, the leaf spring assembly further includes a U-bolt configured to connect the leaf spring component and the main structure. Two ends of the reinforcing plate are connected to the main structure by the U-bolt. Moreover, the U-bolt is simple in structure and lightweight. The U-bolt fits the two ends of the reinforcing plate, thereby facilitating a firmer connection between the leaf spring component and the main structure.

A second aspect of an embodiment of this application provides a vehicle including the suspension structure described above. The suspension structure in the vehicle of this embodiment is not only lightweight, highly capable of cushioning and damping, but is also more stable when impacted, thereby improving the travelling comfort of the vehicle.

In the suspension structure provided in this embodiment of this application, the original lower swing arms are replaced with two leaf spring components, thereby saving two lower swing arms arranged left and right in the suspension structure. In addition, the mass of the leaf springs is low, thereby implementing the lightness of weight of the suspension structure. Moreover, the two leaf spring components are connected together by a connecting bracket that contains a ball pin, thereby implementing the effect of large-angle steering of the wheels. The damper is arranged between the two leaf spring components so that the damper is located at the wheel hop center. In this way, the force distribution is more uniform, and the damping effect is better. Each leaf spring component includes at least two leaf springs, thereby improving the elastic stiffness of the leaf spring component and increasing the connection strength of the suspension structure. In addition, the U-shaped bolt and the reinforcing plate improve firmness of the connection between the two leaf springs on the one hand, and on the other hand, implement a firmer connection between the leaf spring assembly and the main structure, so as to improve the stability of the suspension structure and ensure that the vehicle can run smoothly.

Beneficial Effects

In the technical solution of an embodiment of this application, by replacing the original lower swing arms with the leaf spring assembly, this application saves two lower swing arms arranged left and right in the suspension structure. In addition, the leaf spring assembly is connected to the steering knuckle by the connecting bracket to serve a steering function concurrently, thereby implementing the lightness of weight of the suspension structure. Moreover, the leaf spring assembly includes two leaf spring components arranged in the front-to-back direction, thereby improving the connection strength and transverse stiffness of the suspension structure. In addition, the leaf spring components are light in weight and highly capable of cushioning and damping, thereby improving the stability of the suspension structure, and in turn, enhancing the travelling comfort of the vehicle. Furthermore, the connecting bracket includes a ball pin. The ball pin can provide a degree of steering freedom to achieve the large-angle steering effect of the wheel.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
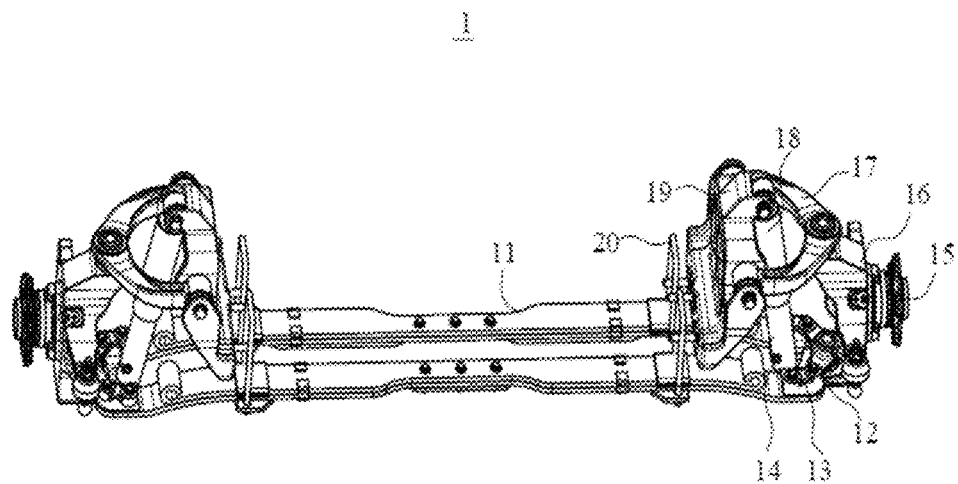
FIG. 1 is a schematic structural diagram of a suspension structure according to an embodiment of this application.

The drawings are not drawn to scale.

LIST OF REFERENCE NUMERALS

1—suspension structure; 11—leaf spring component; 110—free end; 111—first leaf spring; 112—second leaf spring; 113—leaf spring connector; 114—mounting portion; 115—leaf spring fixing hole; 116—rolled lug; 12—connecting bracket; 121—first arm body; 122—second arm body; 123—ball pin; 13—first fixing mechanism; 14—first connecting mechanism; 15—wheel bearing; 16—steering knuckle; 17—upper swing arm; 18—damper; 19—subframe; 20—U-bolt; 21—damper mounting bracket; 22—reinforcing plate; 23—leaf spring mounting bush; X—vertical direction; Y—length direction.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

The term "and/or" herein merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

The directional terms appearing in the following description indicate the directions shown in the drawings, but are not intended to limit specific structures in this application. In the description of this application, unless otherwise expressly specified and defined, the technical terms such as "mounting", "concatenation", "connection", and "fixing" need to be understood in a broad sense, for example, understood as a fixed connection or a detachable connection or a one-piece connection; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in this application according to specific situations.

Currently, as a market trend, the application scenarios and market demands for vehicles are progressively diversified. To meet different application scenarios and market demands, vehicles have been improved greatly in terms of power source, suspension structure, body structure, and the like. The suspension structure is a generic term for all the power transmission linkage apparatuses between a frame and wheels of a vehicle, and is configured to transmit the force and torque between the frame and the wheels, cushion the impact load transmitted to the frame due to a uneven road surface, and attenuate vibration of the vehicle body caused by road surface impact, so as to ensure smooth movement of the vehicle. Therefore, the research and development and improvement of the suspension structure in the field of vehicles, especially in the field of automobiles, have attracted a lot of attention.

The applicant hereof finds that a conventional suspension structure generally includes an elastic element, a steering mechanism, a damper, and the like, and in some cases, may further include a buffer block, a stabilizer bar, and the like. The elastic element is typically a spring, a leaf spring, or the like. In a case that the elastic element is a leaf spring, the elastic element is generally formed by a group of leaf spring components. The steering mechanism generally includes a steering knuckle, an upper swing arm, a lower swing arm, and the like. In addition, rear wheels of most vehicles with independent suspension lacks a steering function. For the rear wheels with the steering function, the steering angle is controlled within the range of 3° to 5°, and the decrease in the turning radius is insufficient. Moreover, the independent suspension generally contains an independent elastic element and an independent lower swing arm, thereby incurring a high cost, a heavy weight, and a complex structure.

The applicant further finds that the length of the existing lower swing arm is relatively small, thereby leading to a violent change in the ground contact point of the tire and a violent change in the camber angle of the suspension structure during movement, and in turn, resulting in severe wear of the tire and poorer running stability of the vehicle. By adjusting the geometric dimensions of the suspension structure, this application can alter the change in the parameters such as the camber angle and toe-in angle of the suspension structure during movement, so as to improve the running stability of the vehicle. Specifically, the running stability of the vehicle can be improved by increasing the arm length of the lower swing arm, so that the transverse movement amplitude of the vehicle will be smaller in the same movement stroke, the change in the ground contact point of the tire will be smaller, and the change in the camber angle will be smaller. Therefore, improvement may be made by increasing the arm length of the lower swing arm, but the lightness of weight of the suspension structure needs to be considered at the same time.

To achieve lightweight design of the suspension structure and improve the running stability of the vehicle, the applicant has designed a suspension structure after in-depth research. Specifically, the conventional lower arm is replaced by two leaf spring components, and the two leaf spring components are connected to the steering knuckle by a connecting bracket. On the one hand, the leaf spring component serves a steering function concurrently, thereby saving the two lower arms arranged left and right in the existing suspension structure, and implementing the lightness of weight of the overall suspension structure. On the other hand, the leaf spring itself may act to couple the elasticity of the coil spring in the conventional suspension structure and the steering and power transmission function of the lower control arm, thereby simplifying the coil spring on the damper. In this way, the lightness of weight of the suspension structure is implemented while the leaf spring acts as a coil spring to absorb vibration.

At the same time, the two ends of the two leaf spring components arranged along the front-to-back direction are connected by a connecting bracket containing a ball pin structure, and can act together with the upper swing arm to form a main pin. In addition, the ball pin can provide a degree of freedom to achieve the large-angle steering effect of the rear wheels. In addition, the leaf spring assembly in the suspension structure of this application includes two leaf spring components, thereby improving the transverse stiffness of the suspension structure. Furthermore, the leaf spring components act as lower swing arms to increase the length of the arms, thereby improving the running stability of the vehicle. To improve the stability of the vehicle, in the suspension structure of this application, the left and right wheels on one axle of the vehicle are mounted separately below the body and/or subframe (main structure). The axle bridge is discontinuous, and a middle segment of the axle bridge is fixed to the body and/or subframe. Therefore, when a wheel on one side of the suspension structure of this application is impacted, the impact does not affect the wheel on the other side. Moreover, the suspension structure is light in weight and highly capable of cushioning and damping, thereby improving the stability of the suspension structure as well as the comfort of the travelling vehicle.

It is hereby noted that the suspension structure described in this embodiment of this application is applicable to a vehicle, other mechanical equipment equipped with a suspension structure, and the like. The vehicle may be an oil-fueled vehicle, a natural gas vehicle, a new energy vehicle, a motorcycle, or the like. The new energy vehicle may be a battery electric vehicle, a hybrid electric vehicle, a range-extended electric vehicle, or the like. The type of the vehicle is not particularly limited in this embodiment of this application.

Figure 2:
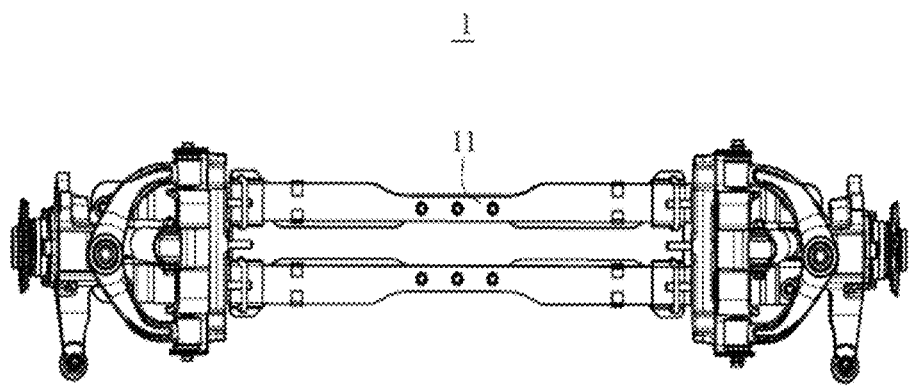
FIG. 2 is a top view of a suspension structure according to an embodiment of this application.
Figure 3:
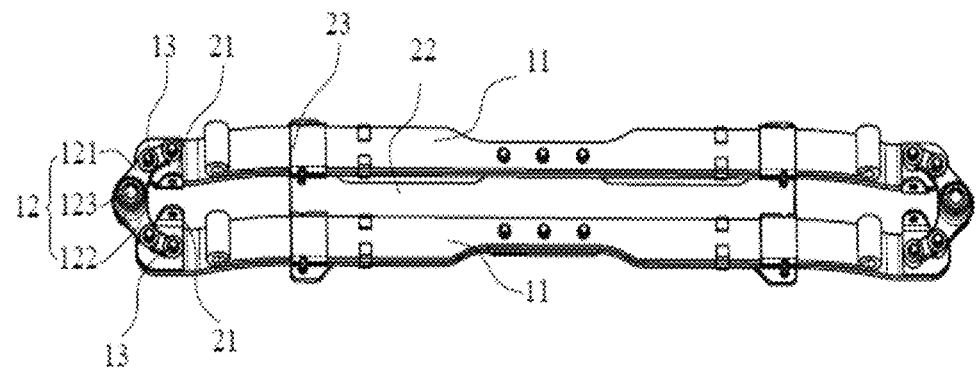
FIG. 3 is a schematic exploded view of a suspension structure according to an embodiment of this application.
Figure 4:
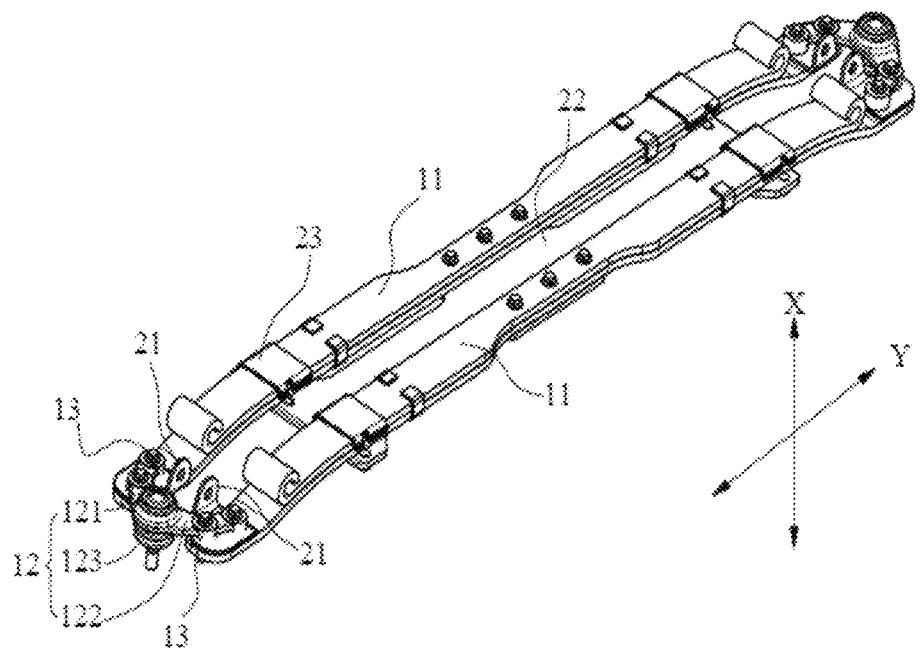
FIG. 4 is an axonometric exploded view of a suspension structure according to an embodiment of this application.
Figure 5:
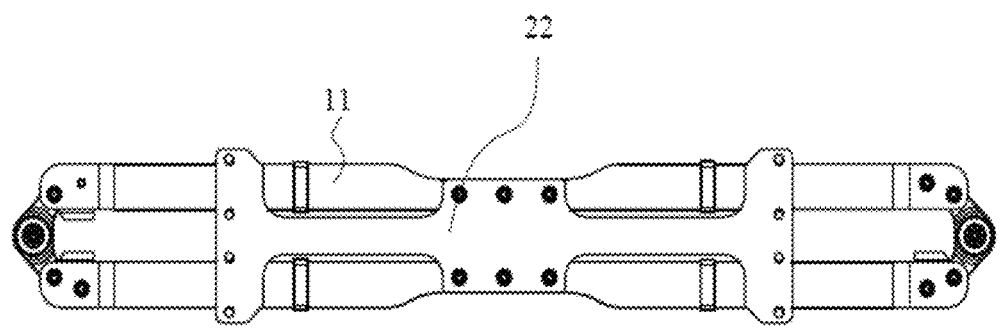
FIG. 5 is an exploded bottom view of a suspension structure according to an embodiment of this application.
Figure 6:
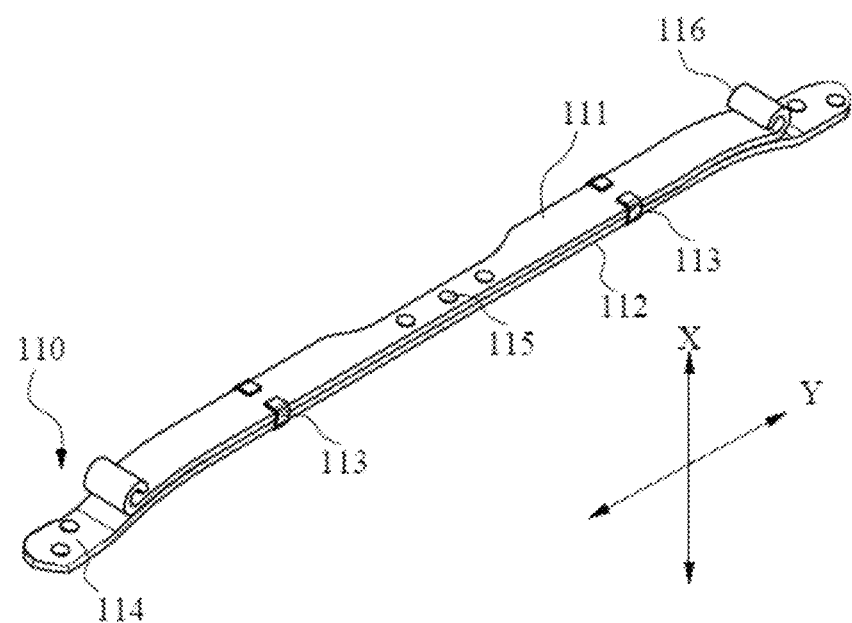
FIG. 6 is a schematic structural diagram of a leaf spring component according to an embodiment of this application.

According to some embodiments of this application, referring to FIG. 1 and FIG. 2, FIG. 1 is a schematic structural diagram of a suspension structure according to an embodiment of this application, and FIG. 2 is a top view of a suspension structure according to an embodiment of this application. Referring to FIG. 3 to FIG. 5, FIG. 3 to FIG. 5 are schematic exploded views of a suspension structure from different viewing angles according to some embodiments of this application. Referring to FIG. 6, FIG. 6 is a schematic structural diagram of a leaf spring component according to an embodiment of this application. An embodiment of this application discloses a suspension structure 1, including: a leaf spring assembly, a connecting bracket 12, and a steering knuckle 16. The leaf spring assembly includes two leaf spring components 11 arranged along a front-to-back direction. Each of the leaf spring components 11 is arranged transversely relative to a main structure (not shown in the drawing). The middle of each leaf spring component 11 is fixedly connected to the main structure. Two free ends 110 are disposed along a length direction of each leaf spring component 11. The free ends 110 include a mounting portion 114. The connecting bracket 12 includes a bracket body and a ball pin 123. The bracket body includes a first arm body 121 and a second arm body 122. The first arm body 121 intersects one end of the second arm body 122, and is connected to the ball pin 123 at an intersecting end. The first arm body 121 and another end of the second arm body 122 are fixedly connected to two adjacent mounting portions 114 of the two leaf spring components 11 respectively by a first fixing mechanism 13. A lower end of the steering knuckle 16 is connected to the ball pin 123 of the connecting bracket 12.

The suspension structure 1 is a generic term for all the power transmission linkage apparatuses between a frame or body and wheels of a vehicle, and is configured to transmit the force and torque between the frame and the wheels, cushion the impact load transmitted to the frame or body due to a uneven road surface, and attenuate vibration of the vehicle body caused by road surface impact, so as to ensure smooth movement of the vehicle. The suspension structure 1 may include an elastic element, a steering mechanism, a damper 18, and the like, and in some cases, may further include a buffer block, a stabilizer bar, and the like. The elastic element is typically a spring, a leaf spring, or the like, and preferably a leaf spring. The steering mechanism generally includes an upper swing arm 17, a lower swing arm, a steering knuckle 16, and the like, and is configured to transmit a force and a torque and serve a steering function concurrently, and can control the movement track of the wheels during running of the vehicle. Moreover, the suspension structure 1 may be formed by two leaf spring components 11, and may provide mounting space for the connecting bracket 12 and the damper 18, so that the damper 18 is located on the wheel hop centerline without withstanding the bias torque. The suspension structure is a novel structure.

The leaf spring assembly of this embodiment of this application includes components such as two leaf spring components 11 arranged in a front-to-back direction. The leaf spring component 11 is a conventional elastic element and steering mechanism in the suspension structure 1 of a vehicle, and may be configured to transmit various forces and torques. The leaf spring component exerts a friction damping effect to some extent. The leaf spring is generally a group of spring beams of approximately equal strength, and is formed by a plurality of alloy spring steel sheets of unequal lengths. To increase the connection strength of the leaf spring component 11, the leaf spring component 11 shown in FIG. 6 includes at least two leaf springs, including a first leaf spring 111 and a second leaf spring 112. The term "at least two" means two or more. The number of leaf springs is not particularly limited in this embodiment of this application. In the leaf spring component 11 in FIG. 6, the lengths of the leaf springs decrease gradually from bottom up, but are not limited in this embodiment of this application, and may increase gradually or increase irregularly from bottom up. The leaf springs may be made of a material such as alloy steel or the like. Depending on the shape, the leaf springs may be categorized into elliptical leaf springs, semi-elliptical leaf springs, quarter-elliptical leaf springs, and blade springs. All of the above four types of leaf springs are combo-type leaf springs, and achieve relatively high cushioning and damping performance by virtue of friction between the spring and the plate. The leaf spring shown in FIG. 6 is preferably a blade spring, but not limited in this embodiment of this application, and may be another type of leaf spring.

The free end 110 is an acting end that is not restricted from all degrees of freedom on the leaf spring component 11, and may be configured to be connected to the connecting bracket 12, the steering knuckle 16, the damper 18, and other components. For ease of mounting, as shown in FIG. 2, each leaf spring component 11 is equipped with two free ends 110. Each free end 110 is equipped with a mounting portion 114. Further, understandably, referring to FIG. 6, the leaf spring component 11 includes a first leaf spring 111 and a second leaf spring 112. Two first free ends are disposed at two ends of the first leaf spring 111, and two second free ends may also be disposed at two ends of the second leaf spring 112. In other words, the free ends 110 may include a first free end and a second free end. The free ends 110 and the leaf springs may be formed in one piece or detachably connected, depending on the needs of the actual application scenario. It is hereby noted that, referring to FIG. 6, it is preferable in this embodiment of this application that the free ends 110 are disposed on the first leaf spring 111. To be specific, the free ends 110 of the leaf spring components 11 are disposed on the first leaf spring 111.

The connecting bracket 12 is a connecting component including a bracket body and a ball pin 123, and is primarily configured to connect the two leaf spring components 11 in the suspension structure 1 together. The connecting bracket 12 also connects the steering knuckle 16 to the mounting portion 114 of the leaf spring component 11. Referring to FIG. 3 and FIG. 4, the connecting bracket 12 is fork-shaped and is made of a material of very high mechanical strength and fatigue durability, such as steel. The connecting bracket 12 includes two arm bodies: a first arm body 121 and a second arm body 122. The first arm body 121 and the second arm body 122 are symmetrically disposed with respect to the ball pin 123. The two arm bodies may be of the same size and dimensions and made of the same material. In addition, at least two arm body through-holes may be created in the two arm bodies, and are configured to be connected to the mounting portions 114 of the leaf spring components 11. In an embodiment of this application, two connecting brackets 12 are disposed on one suspension structure 1, and are located at two ends of the leaf spring assembly respectively.

Ball pins 123 are widely used in the suspension structure 1. A control arm or a propelling rod is usually connected to other components by the ball pin 123 located at the ends. The ball pins are configured to implement up-and-down hops and steering movements of the wheel. The ball pin 123 may act together with the upper swing arm 17 to form a main pin to achieve the large-angle steering effect of the wheel. The structure of the ball pin 123 may be a combination of a spherical pin and an integrated ball seat, or may be a combination of a semispherical ball pin and a spherical member. The structure of the ball pin is not particularly limited in this application. The ball pin 123 primarily includes a ball head, a ball seat, and other components, and is located in the middle of the connecting bracket 12, and is connected to the lower end of the steering knuckle 16 to implement the guiding function of the steering knuckle 16. Specifically, the leaf spring assembly in this embodiment of this application acts as a lower swing arm. The ball pin 123 is connected to the mounting portion of the lower swing arm at the lower end of the steering knuckle 16. In addition, depending on the size of the arrangement space and the type of the control arm, the ball pin 123 is connected to the control arm in different ways such as bolting or riveting, being directly pressed into the control arm, or being integrated with the control arm in one piece. The ways of connection are not particularly limited in this embodiment of this application.

The steering knuckle 16 is a part of the steering knuckle assembly. The steering knuckle assembly is assembled from the components such as the steering knuckle 16, the mounting portion of the lower swing arm, and the mounting portion of the upper swing arm. Moreover, the steering knuckle 16 is a steering mechanism in the suspension structure 1, and the steering knuckles are arranged left and right symmetrically. As a hinge for wheel steering, the steering knuckle may be configured to transmit a force and a torque and play a guiding role concurrently. The steering knuckle 16 is of very high mechanical strength and fatigue durability. In a running state of the vehicle, the steering knuckle 16 can withstand the wheel load, the road surface impact, and random loads brought by steering, braking, and the like, so as to ensure that the vehicle can run safely and steer flexibly. In addition, as shown in FIG. 1, the steering knuckle 16 is generally fork-shaped. The upper fork and the lower fork include two coaxial holes configured to holding the main pin. The axle journal of the steering knuckle 16 is configured to mount the wheel. The steering knuckle 16 supports and drives the wheel to rotate around the main pin to steer the vehicle. Considering the lightweight design of the steering knuckle 16, the mounting portion of the lower swing arm of the steering knuckle 16 may be connected to the ball pin 123 in the connecting bracket 12 to reduce the size of the steering knuckle 16 in the vertical direction, thereby reducing the weight of the steering knuckle 16. The mounting portion of the upper swing arm of the steering knuckle 16 is connected to the upper swing arm 17, and may be configured to withstand a specified bend-and-torsion joint torque, thereby being conducive to free steering of the wheel. In addition, both the steering knuckles 16 and the upper swing arms 17 are arranged symmetrically left and right in the suspension structure 1.

In the technical solution of an embodiment of this application, by replacing the original lower swing arms with the leaf spring assembly, this application saves two lower swing arms arranged left and right in the suspension structure 1. In addition, the leaf spring assembly is connected to the steering knuckle 16 by the connecting bracket 12 to serve a steering function concurrently, thereby implementing the lightness of weight of the suspension structure 1. Moreover, the leaf spring assembly includes two leaf spring components 11 arranged in the front-to-back direction, thereby improving the connection strength and transverse stiffness of the suspension structure 1. In addition, the leaf spring components 11 are light in weight and highly capable of cushioning and damping, thereby improving the stability of the suspension structure 1, and in turn, enhancing the travelling comfort of the vehicle 100. Furthermore, the connecting bracket 12 includes a ball pin 123. The ball pin 123 can provide a degree of steering freedom to achieve the large-angle steering effect of the wheel.

According to some embodiments of this application, still referring to FIG. 1, the suspension structure 1 further includes a damper 18 and two damper mounting brackets 21. The two damper mounting brackets 21 are disposed on the two adjacent mounting portions 114 of the two leaf spring components 11 respectively. The damper 18 is connected to the two damper mounting brackets 21 by a first connecting mechanism 14.

The damper 18 is a part of a damper assembly. The damper assembly includes components such as the damper 18, a lower spring pad, a dust sleeve, a spring, a damping pad, an upper spring pad, a spring seat, a bearing, top rubber, and a nut. Moreover, the damper 18 is one of the important components of the suspension structure 1. The dampers are arranged left and right symmetrically, and are installed in parallel with the elastic element to jointly serve the functions of cushioning and damping. The damper 18 is primarily configured to suppress shock on a rebound after the spring absorbs the shock and the impact from the road surface, and is intended to counteract the torsional vibration of a crankshaft. Depending on the damping material, the damper 18 is primarily categorized into hydraulic dampers and gas-filled dampers, and variable-damping dampers 18. Depending on the structure, the dampers 18 are primarily categorized into double-cylinder dampers and single-cylinder dampers, and may be further subdivided into a single-cylinder pneumatic damper, a double-cylinder hydraulic damper, and a double-cylinder hydraulic-pneumatic damper.

In this embodiment of this application, the leaf spring component 11 acts as a lower swing arm and can play a guiding role, and the leaf springs are elastic. Therefore, preferably, the damper 18 of this embodiment of this application can simplify the coil spring, and the guiding effect of the lower control arm is coupled with the elastic effect of the coil spring of the damper 18 by the leaf springs, thereby implementing the simplicity and lightness of weight of the suspension structure 1, and reducing the manufacturing cost. Further, understandably, in order to better cushion the shock generated by the impact on the elastic element, the damper 18 may be connected to the mounting portion 114 of the leaf spring component 11, and located at the wheel hop centerline. In this way, the force received to the damper 18 can be applied directly to the wheel hop centerline, and the bias torque of the damper 18 can be avoided.

The damper mounting bracket 21 is a component configured to mount the damper 18. The damper mounting bracket 21 is L-shaped or in other shapes, and includes a side ear part and a body part. The body part is connected, together with the arm body of the connecting bracket 12, to the mounting portion 114 of the leaf spring component 11 by a bolt and nut. The side ear part is connected to the damper 18. The side ear part is located on a side of the body part, the side being close to the middle of the leaf spring assembly. The side ear part may be oriented vertically downward, vertically upward, or in another direction suitable for mounting the damper 18. Referring to FIG. 3 to FIG. 4, as an example, four damper mounting brackets 21 exist on the leaf spring assembly in total, and are located on the free ends 110 of the leaf spring components 11 respectively. One damper 18 is mounted between the two damper mounting brackets 21. The damper mounting brackets 21 may be made of a metal material such as aluminum alloy, steel, iron, or the like, or another high-strength material. The material is not particularly limited in this application.

The damper mounting brackets 21 are disposed on the mounting portions 114 of the leaf spring components 11, and provide mounting positions for the damper 18. In this way, the damper 18 is connected between the two leaf spring components 11 and arranged on a wheel hop centerline. The damper 18 is stressed evenly and can avoid withstanding a bias torque, thereby providing a better damping effect to improve the stability of the suspension structure 1.

According to some embodiments of this application, still referring to FIG. 1, the damper mounting bracket 21 and the mounting portion 114 of the leaf spring component 11 are formed in one piece or fixedly connected.

The one-piece formation means that the damper mounting bracket 21 is stamped, forged, or cast together with the leaf spring as a single piece, thereby improving the connection strength of the damper mounting bracket 21 and making the damper mounting bracket less prone to break off. Specifically, the damper mounting bracket 21 and the mounting portion 114 of the leaf spring component 11 are formed in one piece. In addition, the damper mounting bracket 21 may be fixedly connected to the mounting portion 114 of the leaf spring component 11. To be specific, the damper mounting bracket 21 is fixed to the mounting portion 114 of the leaf spring component 11 by a first fixing mechanism 13, preferably by a bolt.

The one-piece formation or fixed connection makes the damper mounting bracket 21 be fixed to the mounting portion 114, thereby making it convenient to mount the damper 18 between the two leaf spring components 11.

According to some embodiments of this application, still referring to FIG. 1, the first fixing mechanism 13 and the first connecting mechanism 14 each include a bolt and a nut.

The first fixing mechanism 13 is a mechanism for fixing at least two components together. Optionally, the first fixing mechanism 13 is a mechanism that enables switching between a locked state and an unlocked state. The fixing mechanism may be bolting or another type of connection. Still referring to FIG. 1, as an example, the first fixing mechanism 13 fixedly connects the connecting bracket 12 and the damper mounting bracket 21 to the mounting portion 114 of the leaf spring component 11. To be specific, the first arm body 121 and another end of the second arm body 122 in the connecting bracket 12 are fixedly connected to two adjacent mounting portions 114 of the two leaf spring components 11 respectively by the first fixing mechanism 14.

The first connecting mechanism 14 is a mechanism configured to connect the damper 18 to the damper mounting bracket 21. The first connecting mechanism 14 may be bolting or another type of movable connection, and preferably bolting. The first connecting mechanism 14 includes a spindle, a bolt and a nut. After being embedded into the spindle, the bolt fits the nut to connect one damper 18 onto two damper mounting brackets 21, thereby mounting the damper 18 between two leaf spring components 11. Understandably, the first connecting mechanism 14 may be a connection manner that is movable within a specified range.

The bolt-and-nut connection is bolting. The first fixing mechanism 13 and the first connecting mechanism 14 each include a bolt and a nut to achieve the purposes of fastening and position limiting. If the nut is screwed off from the bolt, or the bolt is screwed off from the nut, then the two components, the bolt and the nut, can be separated. Therefore, the bolting is a detachable connection. In this embodiment of this application, the bolt is a cylindrical threaded fastener for fit with a nut. Further, understandably, the bolt is a type of fastener consisting of a bolt head and a screw rod (a cylindrical body with external threads) and designed to fit a nut, and is configured to fasten a plurality of components in which through-holes are created. The bolt head is in a shape such as hexagonal head, round head, square head, countersunk head, or the like. The nut is a component screwed together with the bolt to play a fastening role, and is in a shape such as circle, ring shape, butterfly, polygon, or the like. The bolt and the nut may be made of a material such as carbon steel, stainless steel, copper, or alloy.

The bolt combines with the nut to implement position limiting and fastening, and also implement a detachable assembling manner of the first fixing mechanism 13 and the first connecting mechanism 14.

According to some embodiments of this application, the leaf spring component 11 includes at least two leaf springs, a leaf spring connector 113, and two mounting portions 114. The at least two leaf springs overlap along a vertical direction. Lengths of the at least two leaf springs decrease gradually from bottom up. The at least two leaf springs include a first leaf spring 111 and a second leaf spring 112. The length of the first leaf spring 111 is greater than the length of the second leaf spring 112. The leaf spring connector 113 is configured to fixedly connect lengthwise body portions of the at least two leaf springs together. The two mounting portions 114 are disposed at the free end 110 of the first leaf spring 111.

The leaf spring connector 113 is configured to fixedly connect the body portions of the at least two leaf springs in the leaf spring component 11 together. The connector generally includes a locking piece and a position limiter, and may be bolting, snap-fastening, and or another detachable connection, or may be implemented in a one-piece formation manner such as welding, riveting, or stamping. The leaf spring connector 113 mostly implements a detachable connection. The bolting may be a combination of a nut and a bolt, and is a connection manner that connects two or more components or members into a whole by using a bolt. To be specific, a bolting component can fix the body portions of all leaf springs in the leaf spring component 11. The snap-fastening may be implemented by a combination of a buckle and a limiting block or by using a member such as a circlip or a grommet, and is configured to limit movement of the leaf spring.

The mounting portions 114 are located at the free end 110 of the first leaf spring 111, and are configured to mount the components such as the connecting bracket 12 and the damper mounting bracket 21. One leaf spring component 11 includes a mounting portion 114 and a force-withstanding member to be connected, and possesses a high load-bearing capacity and high stability, and is deformation-resistant and corrosion-resistant. In addition, the mounting portion 114 can withstand a concentrated load and pressure. Referring to FIG. 6, the mounting portion 114 is specifically disposed on the first leaf spring 111. One mounting portion 114 includes two through-holes. The bolt and the nut fix the connecting bracket 12 and the damper mounting bracket 21 to the mounting portion 114 through the through-holes.

The "length direction" is a direction extending along the length of the leaf spring with respect to the leaf spring itself. Referring to FIG. 6, the "length direction" is a Y direction. As shown in FIG. 2, a total of two mounting portions 114 are disposed at two ends of one leaf spring component 11 along the length direction of the leaf spring. Furthermore, the "vertical direction" is a direction perpendicular to the horizontal plane when the leaf spring component 11 is placed parallel to the horizontal plane, or a direction perpendicular to the length direction of the leaf spring component 11, that is, the X-direction in FIG. 6. At least two leaf springs overlap along the vertical direction of the leaf spring. The term "overlap" means that at least two leaf springs are stacked in layers. Preferably, when the leaf springs overlap in the vertical direction, the lengths of the at least two leaf springs may decrease gradually from bottom up.

The leaf spring component 11 includes at least two leaf springs, thereby not only enhancing the connection strength and durability of the leaf spring component 11, but also improving the fatigue life of the leaf spring component 11. Moreover, the first leaf spring 111 is equipped with two mounting portions 114, thereby providing mounting space for the damper 18 and the connecting bracket 12, and in turn, improving the utilization rate of the mounting space of the vehicle 110.

According to some embodiments of this application, still referring to FIG. 6, two ends of the second leaf spring 112 are rolled lugs 116. The second leaf spring 112 is disposed above the first leaf spring 111.

"Above" is opposite to "below" along the vertical direction (that is, the X-direction). The first leaf spring 111 is located at the lowermost end of the leaf spring component 11. Other leaf springs are located above the first leaf spring 111. The second leaf spring 112 is also located above the first leaf spring 111. Moreover, the lengths of the leaf springs decrease gradually from bottom up, so that the length of the second leaf spring 112 is less than the length of the first leaf spring 111.

The shape of the rolled lug 116 may be a circular arc, an elliptical arc, a rectangular arc, or a polygonal arc, and is preferably a circular arc or elliptical arc so that an amount of accommodation space and a degree of freedom are provided.

Because the length of the first leaf spring 111 is greater than the length of the second leaf spring 112, arranging the second leaf spring 112 above the first leaf spring 111 makes it convenient to form a rolled lug 116 structure at both ends of the second leaf spring 112, and improves the elastic stiffness of the leaf spring assembly. In addition, when a wheel is impacted, the rolled lug 116 structure of the second leaf spring 112 can provide space for the first leaf spring 111 to bounce up and down.

According to some embodiments of this application, the leaf spring assembly further includes a reinforcing plate 22 and a leaf spring mounting bush 23. The reinforcing plate 22 is disposed below the two leaf spring components 11 and configured to support the two leaf spring components 11. The leaf spring mounting bush 23 is disposed on the leaf spring component 11 at a position opposite to the reinforcing plate 22.

The reinforcing plate 22 is configured to connect two tandem-arranged leaf springs 11 together. The reinforcing plate 22 may be in a plate shape or another shape, and may be made of a high-strength material such as stainless steel, and is not prone to deform. Referring to FIG. 5, as an example, the reinforcing plate 22 may be Wang-shaped (in a shape formed by three parallel strokes intersected by a perpendicular line). The middle portion of the reinforcing plate 22 is connected to the middle portion of the two leaf spring components 11. The two end portions of the reinforcing plate 22 are fixedly connected to other parts of the leaf spring component 11 and to the leaf spring mounting bush 23, thereby further enhancing the connection strength and stability of the suspension structure 1.

The leaf spring mounting bush 23 is a companion piece that wraps the leaf spring component 11 to serve the functions such as wear protection, position limiting, and padding. In this embodiment of this application, the leaf spring mounting bush 23 is located on the leaf spring component 11 at a position opposite to the end portion of the reinforcing plate 22, and this position bears a large load and force, and is prone to wear and tear. In this case, the leaf spring mounting bush 23 may be configured to withstand shock, friction, and corrosion to protect the wrapped components. The bush itself is easy to replace after being damaged, and is cost-effective and inexpensive. The leaf spring mounting bush 23 is typically made of a soft metal, rubber, nylon, non-metallic polymer, or another material. The material is not particularly limited in this application.

The reinforcing plate 22 configured to support the two leaf spring components 11 improves the connection strength of the suspension structure 1. The leaf spring mounting bush 23 configured to wrap the leaf spring component 11 further fastens the first leaf spring 111 and the second leaf spring 112, limits positions of the first leaf spring 111 and the second leaf spring 112 lengthwise and vertically when the wheels are hopping, and also serves a padding function and a wear protection function.

According to some embodiments of this application, still referring to FIG. 6, a plurality of leaf spring fixing holes 115 are created in the middle of each leaf spring component 11. The middle of the reinforcing plate 22 is connected to the two leaf spring components 11 through the leaf spring fixing holes 115.

The leaf spring fixing holes 115 are a through-hole structure configured to fix the reinforcing plate 22 and the leaf spring component 11. The shape, dimensions, and size of the leaf spring fixing holes fit the bolt and nut. To be specific, if the bolt is cylindrical, the leaf spring fixing hole 115 is circular accordingly.

The leaf spring fixing holes 115 created in the middle of leaf spring component 11 make it convenient to mount the reinforcing plate 22. The reinforcing plate 22 not only enhances the firmness of connection between the two leaf spring components 11, but also improves the stability of the entire suspension structure 1, and in turn, increases the load-bearing capacity of the suspension structure 1.

According to some embodiments of this application, still referring to FIG. 1 to FIG. 2, the leaf spring assembly further includes a U-bolt 20 configured to connect the leaf spring component 11 and the main structure (not shown in the drawing). Two ends of the reinforcing plate 22 are connected to the main structure by the U-bolt 20.

The U-bolt 20, also known as riding bolt, is versatile, and contains threads at both ends to fit the nut (not shown in the drawing). Referring to FIG. 1, as an example, at least two U-bolts 20 exist in the suspension structure 1, and are arranged left and right opposite to each other, which are configured to fix the middle portion of the leaf spring component 11 in the suspension structure 1 onto the main structure of the vehicle. The U-bolts 20 run through the reinforcing plate 22, the leaf spring mounting bush 23, the leaf spring component 11, and the main structure, and are fixedly connected to the main structure. By means of bolts and nuts, the lower ends of the U-bolts 20 press the reinforcing plate 22 and the leaf spring mounting bush 23 onto the leaf spring component 11 tightly.

The U-bolt 20 is simple in structure and lightweight. The U-bolt fits the two ends of the reinforcing plate 22, thereby facilitating a firmer connection between the leaf spring component 11 and the main structure.

According to some embodiments of this application, still referring to FIG. 1 to FIG. 2, the suspension structure 1 further includes a wheel bearing 15, an upper swing arm 17, and a subframe 19. The subframe 19 is bolted to a lateral face of the main structure. The upper end of the damper 18 is bolted to the subframe 19. The lower end of the damper 18 is connected to the mounting portion 114 of the leaf spring component 11 by the damper mounting bracket 21. The inner side of the upper swing arm 17 is fixedly bolted to the subframe 19, and the outer side of the upper swing arm 17 is hinged to the upper end of the steering knuckle 16 by an upper swing arm ball pin. The upper swing arm ball pin is structurally identical or similar to the ball pin 123 of the connecting bracket 12. The lower end of the steering knuckle 16 is connected to the ball pin 123 of the connecting bracket 12. The outer side of the steering knuckle 16 is bolted to the wheel bearing 15.

Figure 7:
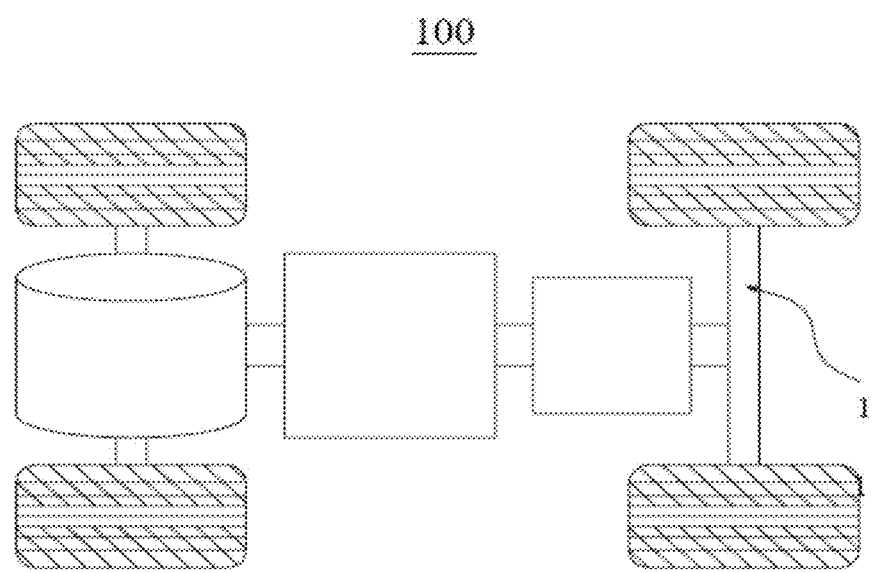
FIG. 7 is a schematic structural diagram of a vehicle according to an embodiment of this application.

Referring to FIG. 7, a second aspect of this application discloses a vehicle 100 including the suspension structure 1 described above.

The suspension structure 1 in the vehicle 100 of this embodiment is not only lightweight, highly capable of cushioning and damping, but is also more stable when impacted, thereby improving the travelling comfort of the vehicle 100.

Although this application has been described with reference to exemplary embodiments, various improvements may be made to the embodiments without departing from the scope of this application, and some components described in the embodiments may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A suspension structure, comprising:
   a leaf spring assembly, comprising two leaf spring components arranged along a front-to-back direction, wherein each of the leaf spring components is arranged transversely relative to a main structure, a middle of each leaf spring component is fixedly connected to the main structure, two free ends are disposed along a length direction of each leaf spring component, and the free ends comprise a mounting portion;
   a connecting bracket, comprising a bracket body and a ball pin; the bracket body comprises a first arm body and a second arm body; the first arm body intersects one end of the second arm body, and is connected to the ball pin at an intersecting end; and the first arm body and another end of the second arm body are fixedly connected to two adjacent mounting portions of the two leaf spring components respectively by a first fixing mechanism;
   a steering knuckle, wherein a lower end of the steering knuckle is connected to the ball pin of the connecting bracket; and
   a damper and two damper mounting brackets, wherein the two damper mounting brackets are disposed on the two adjacent mounting portions of the two leaf spring components respectively; and the damper is connected to the two damper mounting brackets by a first connecting mechanism.

2. The suspension structure according to claim 1, wherein the damper mounting bracket and the mounting portion of the leaf spring component are formed in one piece or fixedly connected.

3. The suspension structure according to claim 1, wherein the first fixing mechanism and the first connecting mechanism each comprise a bolt and a nut.

4. The suspension structure according to claim 1, wherein the leaf spring component comprises:
   at least two leaf springs, wherein the at least two leaf springs overlap along a vertical direction; lengths of the at least two leaf springs decrease gradually from bottom up; the at least two leaf springs comprise a first leaf spring and a second leaf spring; and the length of the first leaf spring is greater than the length of the second leaf spring;
   a leaf spring connector, configured to fixedly connect lengthwise body portions of the at least two leaf springs together; and
   the mounting portion, disposed at the free end of the first leaf spring.

5. The suspension structure according to claim 4, wherein two ends of the second leaf spring are rolled lugs; and the second leaf spring is disposed above the first leaf spring.

6. The suspension structure according to claim 1, wherein the leaf spring assembly further comprises:
   a reinforcing plate, wherein the reinforcing plate is disposed below the two leaf spring components and configured to support the two leaf spring components; and
   a leaf spring mounting bush, wherein the leaf spring mounting bush is disposed on the leaf spring component at a position opposite to an end of the reinforcing plate.

7. The suspension structure according to claim 6, wherein a plurality of leaf spring fixing holes are created in the middle of each leaf spring component; and the middle of the reinforcing plate is connected to the two leaf spring components through the leaf spring fixing holes.

8. The suspension structure according to claim 6, wherein the leaf spring assembly further comprises a U-bolt configured to connect the leaf spring component and the main structure, and end portions of the reinforcing plate are connected to the main structure by the U-bolt.

9. A vehicle, wherein the vehicle comprises the suspension structure according to claim 1.

10. A suspension structure, comprising:
a leaf spring assembly, comprising two leaf spring components arranged along a front-to-back direction, wherein each of the leaf spring components is arranged transversely relative to a main structure, a middle of each leaf spring component is fixedly connected to the main structure, two free ends are disposed along a length direction of each leaf spring component, and the free ends comprise a mounting portion;
a connecting bracket, comprising a bracket body and a ball pin; the bracket body comprises a first arm body and a second arm body; the first arm body intersects one end of the second arm body, and is connected to the ball pin at an intersecting end; and the first arm body and another end of the second arm body are fixedly connected to two adjacent mounting portions of the two leaf spring components respectively by a first fixing mechanism; and
a steering knuckle, wherein a lower end of the steering knuckle is connected to the ball pin of the connecting bracket,
wherein the leaf spring assembly further comprises:
a reinforcing plate, wherein the reinforcing plate is disposed below the two leaf spring components and configured to support the two leaf spring components; and
a leaf spring mounting bush, wherein the leaf spring mounting bush is disposed on the leaf spring component at a position opposite to an end of the reinforcing plate.

11. The suspension structure according to claim 10, wherein a plurality of leaf spring fixing holes are created in the middle of each leaf spring component; and the middle of the reinforcing plate is connected to the two leaf spring components through the leaf spring fixing holes.

12. The suspension structure according to claim 10, wherein the leaf spring assembly further comprises a U-bolt configured to connect the leaf spring component and the main structure, and end portions of the reinforcing plate are connected to the main structure by the U-bolt.

13. The suspension structure according to claim 10, wherein the suspension structure further comprises a damper and two damper mounting brackets; the two damper mounting brackets are disposed on the two adjacent mounting portions of the two leaf spring components respectively; and the damper is connected to the two damper mounting brackets by a first connecting mechanism.

14. The suspension structure according to claim 13, wherein the damper mounting bracket and the mounting portion of the leaf spring component are formed in one piece or fixedly connected.

15. The suspension structure according to claim 13, wherein the first fixing mechanism and the first connecting mechanism each comprise a bolt and a nut.

16. The suspension structure according to claim 10, wherein the leaf spring component comprises:
at least two leaf springs, wherein the at least two leaf springs overlap along a vertical direction; lengths of the at least two leaf springs decrease gradually from bottom up; the at least two leaf springs comprise a first leaf spring and a second leaf spring; and the length of the first leaf spring is greater than the length of the second leaf spring; and
a leaf spring connector, configured to fixedly connect lengthwise body portions of the at least two leaf springs together;
wherein each of the two mounting portions is disposed at the free end of the first leaf spring.

17. The suspension structure according to claim 16, wherein two ends of the second leaf spring are rolled lugs; and the second leaf spring is disposed above the first leaf spring.

18. A suspension structure, comprising:
a leaf spring assembly, comprising two leaf spring components arranged along a front-to-back direction, wherein each of the leaf spring components is arranged transversely relative to a main structure, a middle of each leaf spring component is fixedly connected to the main structure, two free ends are disposed along a length direction of each leaf spring component, and the free ends comprise a mounting portion;
a connecting bracket, comprising a bracket body and a ball pin; the bracket body comprises a first arm body and a second arm body; the first arm body intersects one end of the second arm body, and is connected to the ball pin at an intersecting end; and the first arm body and another end of the second arm body are fixedly connected to two adjacent mounting portions of the two leaf spring components respectively by a first fixing mechanism; and
a steering knuckle, wherein a lower end of the steering knuckle is connected to the ball pin of the connecting bracket,
wherein the leaf spring component comprises at least two leaf springs overlapping along a vertical direction, the at least two leaf springs comprise a first leaf spring and a second leaf spring disposed above the first leaf spring, two ends of the second leaf spring are rolled lugs.

19. The suspension structure according to claim 18, wherein lengths of the at least two leaf springs decrease gradually from bottom up.

20. The suspension structure according to claim 18, wherein the leaf spring component further comprises a leaf spring connector configured to fixedly connect lengthwise body portions of the at least two leaf springs together.

* * * * *